United States Patent
Yamamoto et al.

(10) Patent No.: US 8,690,193 B2
(45) Date of Patent: Apr. 8, 2014

(54) TRANSPORTER VEHICLE

(75) Inventors: Takeo Yamamoto, Ushiku (JP); Yasuki Kita, Toride (JP); Takayuki Sato, Kashiwa (JP); Kazunori Ishihara, Mito (JP); Atsushi Kitaguchi, Tsuchiura (JP); Takehito Ikema, Kasumigaura (JP); Michio Fushiki, Tsuchiura (JP); Tomohiko Yasuda, Kashiwa (JP); Shinji Akino, Ushiku (JP); Yoshifumi Nabeshima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 31 days.

(21) Appl. No.: 13/367,487

(22) Filed: Feb. 7, 2012

(65) Prior Publication Data

US 2012/0205961 A1    Aug. 16, 2012

(30) Foreign Application Priority Data

Feb. 10, 2011 (JP) .................................. 2011-27391

(51) Int. Cl.
*B60S 1/68* (2006.01)
(52) U.S. Cl.
USPC ........................................................ 280/856
(58) Field of Classification Search
USPC .................. 298/1 R; 301/36.3; 280/855, 856; 305/100, 107, 110
See application file for complete search history.

(56) References Cited

U.S. PATENT DOCUMENTS

| | | | | |
|---|---|---|---|---|
| 2,738,986 A | * | 3/1956 | Pelton | 280/856 |
| 2,799,515 A | * | 7/1957 | Lobozzo | 280/855 |
| 2,823,928 A | * | 2/1958 | Dahlstrom | 280/856 |
| 2,839,313 A | * | 6/1958 | Walko | 280/856 |
| 3,464,714 A | * | 9/1969 | Prillinger | 280/855 |
| 3,788,668 A | * | 1/1974 | Perger | 280/851 |
| 3,913,943 A | * | 10/1975 | Tamburino et al. | 280/856 |
| 4,206,825 A | * | 6/1980 | van der Lely | 180/329 |
| 4,818,040 A | * | 4/1989 | Mezzancella et al. | 305/107 |
| 5,188,394 A | * | 2/1993 | Roche et al. | 280/856 |
| 7,131,670 B2 | * | 11/2006 | Kinoshita | 280/856 |
| D596,076 S | * | 7/2009 | Kelley et al. | D12/15 |

FOREIGN PATENT DOCUMENTS

| | | |
|---|---|---|
| JP | 58-97069 U | 7/1983 |
| JP | 2005-053412 A | 3/2005 |

\* cited by examiner

*Primary Examiner* — H Gutman
(74) *Attorney, Agent, or Firm* — Mattingly & Malur, PC

(57) ABSTRACT

Rear wheel tires of a vehicle body are spaced apart from each other in the vehicle width direction. A foreign object removing device is provided between an outer tire and an inner tire of the rear wheels on one side of the vehicle for removing foreign objects between the tires. The foreign object removing device includes a bar-shaped member inserted in a suspended state between the tires, and a shoe provided in a lower end side of the bar-shaped member to collide with foreign objects such as earth and sand, and stones getting in between the tires for flicking out the foreign objects from between the tires. The shoe is replaceably attached to the lower end side of the bar-shaped member by using a bolt. In a case where the shoe wears down, only the shoe is replaced.

2 Claims, 10 Drawing Sheets

TRANSPORTER VEHICLE

TECHNICAL FIELD

The present invention relates to a transporter vehicle such as a dump truck and the like, which is suitably used in transporting crushed stones, earth and sand, or the like excavated from an open-pit stope, a stone quarry, a mine or the like.

RELATED ART

In general, a large-sized transporter vehicle called a dump truck has a liftable loading platform (vessel) on a frame of a vehicle body. The large-sized transporter vehicle carries and transports objects to be transported such as crushed stones or earth and sand to a cargo collection site in a state where the objects to be transported are loaded in a large quantity on the loading platform (Patent Document 1).

The transporter vehicle of this type according to the conventional art comprises an automotive vehicle body, a loading platform which is provided tiltably (liftably) on the vehicle body and on which objects to be transported are loaded, front wheels arranged at the front portion side of the vehicle body to be spaced from each other in the vehicle width direction, rear wheels of a plural-tire type arranged at the rear portion side of the vehicle body to be spaced from each other in the vehicle width direction, and a foreign object removing device for removing foreign objects such as earth and sand, and stones getting in between the rear wheels of the plural-tire type.

The foreign object removing device comprises, for example, a bracket provided in a lower side of the loading platform, and a suspended member (foreign object removing member) an upper end side of which is attached to the bracket in such a manner as to be capable of rocking thereto in the front-rear direction (going direction of the vehicle body) and a lower end side of which is inserted in a suspended state between the rear wheels of the plural-tire type (Patent Document 1).

Here, when foreign objects such as earth and sand, and stones get in (tuck down) between right and left tires constituting the rear wheel of the plural-tire type at the traveling of the transporter vehicle, the foreign object collides with the lower end side of the suspended member constituting the foreign object removing device, so that the foreign object is removed (flicked out) from between the tires.

PRIOR ART DOCUMENTS

Patent Documents

Patent Document 1: Japanese Patent Laid-Open No. 2005-53412 A

SUMMARY OF THE INVENTION

In many cases, a transporter vehicle such as a dump truck travels on uneven road surfaces such as irregular grounds, and when the transporter vehicle travels on such an uneven road surface, the vehicle body rocks to the right or left. At this time, vehicle wheels (rotational center axis thereof) supported through a suspension on the vehicle body become inclined to (in nonparallel with) the vehicle body and the loading platform (bottom surface thereof). In this case, there are some cases where a lower end of a suspended member inserted in a suspended state between rear wheels of a plural-tire type from the loading platform makes contact (sliding contact) with a side surface of a tire constituting the rear wheel.

On the other hand, since fine earth and sand, and the like are attached on the side surface of the tire, when the lower end of the suspended member makes contact with the side surface of the tire, the lower end thereof wears down gradually and sharply due to the sliding contact between the lower end thereof and the earth and sand, and the like. In this manner, when the lower end of the suspended member which has sharply worn down makes contact with the side surface of the tire, there is a possibility that the side surface of the tire is damaged.

For preventing such damage of the side surface of the tire, it is considered to replace the suspended member before the lower end of the suspended member sharply wears down. However, in the transporter vehicle according to the conventional art, there occurs a problem that it is required to replace the entire suspended member (foreign object removing member) and this replacement operation becomes troublesome.

In view of the above-described problems of the conventional art, it is an object of the present invention to provide a transporter vehicle in which, even if a lower end side of a suspended member constituting a foreign object removing device wears down, a replacement operation of the suspended member can be easily performed.

In order to overcome the above-described problems, the present invention is applied to a transporter vehicle comprising: an automotive vehicle body; a loading platform which is provided tiltably on the vehicle body; front wheels arranged at a front side of the vehicle body to be spaced from each other in the vehicle width direction; rear wheels of a plural-tire type arranged at a rear side of the vehicle body to be spaced from each other in the vehicle width direction; and a foreign object removing device for removing foreign objects getting in between the rear wheels of the plural-tire type, wherein the foreign object removing device comprises: a bracket provided in a lower side of the loading platform or in the vehicle body; and a suspended member an upper end side of which is attached to the bracket in such a manner as to be capable of rocking thereto and a lower end side of which is inserted in a suspended state between the rear wheels of the plural-tire type.

The feature of the construction adopted by the present invention lies in that a shoe is provided in a lower end side of the suspended member, which collides with the foreign object which has got in between the rear wheels to flick out the foreign object from between the rear wheels, and the shoe is replaceably attached in the lower end side of the suspended member.

According to this construction, since a portion wearing down accompanying the vehicle traveling can be formed as the shoe which is also replaceably attached in the suspended member, even if the shoe wears down accompanying the vehicle traveling, only the shoe which has worn down may be replaced. Therefore, the replacement operation can be more easily performed as compared to a case of replacing the entire suspended member as in the case of the conventional art.

Because of thus facilitating the replacement operation, the shoe can be the more actively (frequently) replaced before the shoe sharply wears down. Therefore, the tire constituting the rear wheel of the plural-tire type can be hard to be damaged. As a result, durability and lifetime of the tire can be ensured to improve reliability of the transporter vehicle.

In this case, according to the present invention, the bracket may be attached in a lower side of a rear portion of the loading platform to be positioned between the rear wheels of the plural-tire type, and the suspended member may have an upper end side attached through a rocking shaft to the bracket to be capable of rocking thereto. Accordingly, when the loading platform is inclined obliquely backward to slide down an object to be transported from the loading platform, the suspended member can be maintained to be positioned between the rear wheels of the plural-tire type.

According to the present invention, the shoe may be removably attached to the lower end side of the suspended member by a connecting tool. Therefore, securement of a mounting strength of the shoe to the suspended member and the easiness of the removal of the shoe from the suspended member are compatible in a high dimension.

According to the present invention, the suspended member may be formed as an elongated, bar-shaped member, and the shoe may be removably attached to a lower end side of the bar-shaped member by using a connecting tool. Therefore, the shoe can be stably supported to the bar-shaped member.

According to the present invention, the suspended members may be provided to be spaced from each other in the front-rear direction to the going direction of the vehicle body, and are formed by a pair of plate-shaped members extending in the upper-lower direction, and the shoe may be provided with a connecting tool inserted therein to extend in the front-rear direction and be removably attached between the pair of plate-shaped members by using the connecting tool. Therefore, the shoe can be stably supported in a state of being tightly held between both sides in the front-rear direction.

MODE FOR CARRYING OUT THE INVENTION

Figure 1:
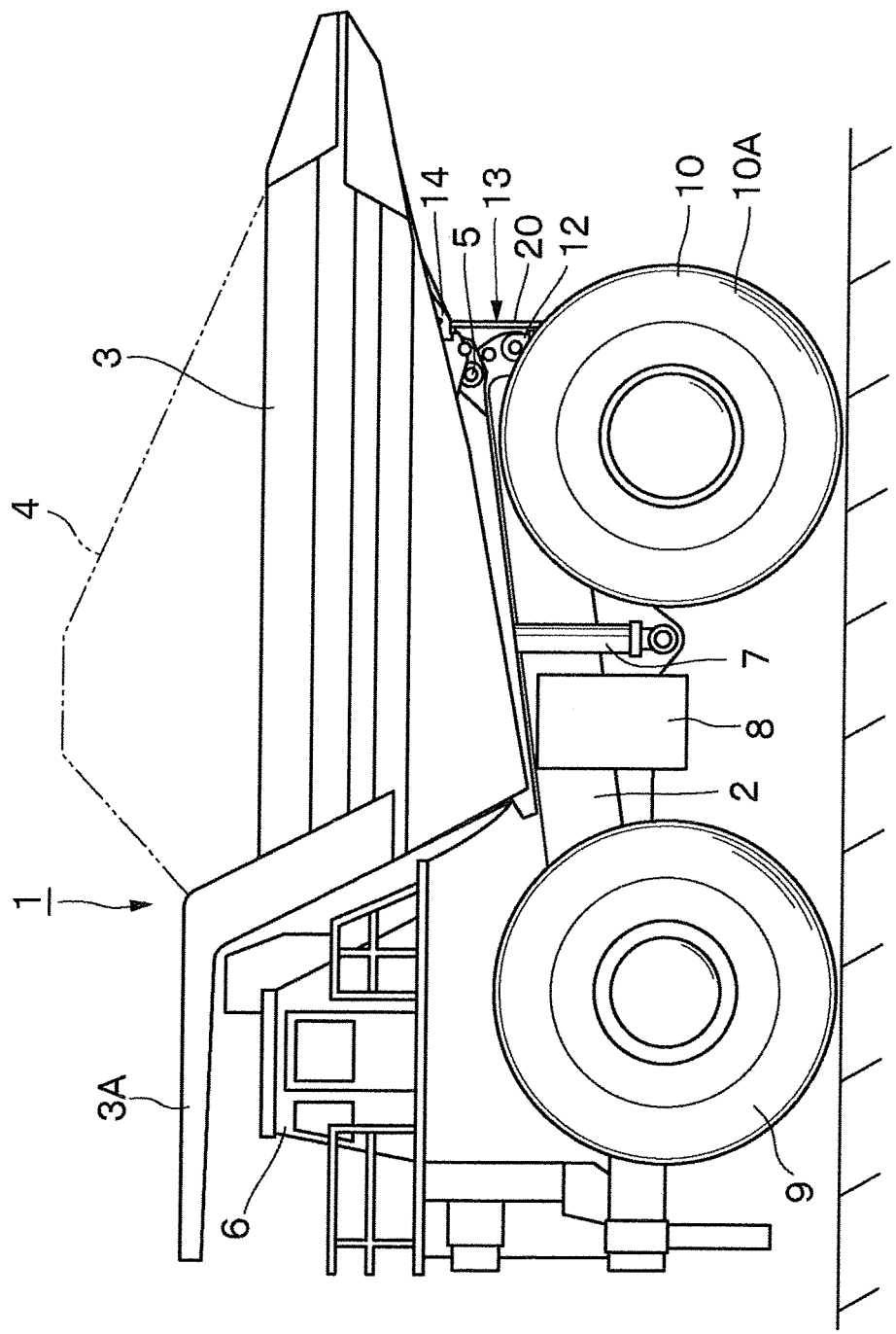
FIG. 1 is a front view showing a dump truck according to a first embodiment in the present invention.

Hereinafter, a transporter vehicle according to an embodiment of the present invention will be in detail explained with reference to the accompanying drawings, by taking a dump truck for transporting crushed stones excavated in amine or the like, as an example.

FIG. 1 to FIG. 7 show a transporter vehicle according to a first embodiment of the present invention.

In the figure, denoted at 1 is a dump truck which is a transporter vehicle. The dump truck 1 is largely constituted by an automotive vehicle body 2 and a loading platform 3 tiltably (liftably) mounted on the vehicle body 2.

The loading platform 3 is usually called a vessel and is formed as a large-sized container whose overall length reaches as much as 10 to 13 meters to load a large volume of heavy objects to be transported such as crushed stones (hereinafter, called crushed stones 4). A rear side bottom portion of the loading platform 3 is liftably (tiltably) coupled to a rear end side of the vehicle body 2 by using a connecting pin 5 and the like. A protector 3A is integrally provided on a front side top portion of the loading platform 3 which covers a cab 6 to be described later from an upper side thereof.

The cab 6 is provided in the front portion of the vehicle body 2 to be located at the lower side of the protector 3A. The cab 6 defines an operating room where a driver of the dump truck 1 gets in/off. A driver's seat, an activation switch, an accelerator pedal, a brake pedal, a steering handle, a plurality of operating levers (any thereof is not shown) and the like are provided inside the cab 6.

A pair of left and right hoist cylinders 7 (only one is shown in FIG. 1) are telescopically provided between the vehicle body 2 and the loading platform 3. The hoist cylinder 7 expands or contracts in the upper-lower direction to tilt (lift) the loading platform 3 by an operation of the connecting pin 5 as a fulcrum.

An operating oil tank 8 is mounted on a side face of the vehicle body 2 to be positioned under the loading platform 3. The operating oil tank 8 accommodates operating oil (hydraulic oil) inside it. The operating oil accommodated in the operating oil tank 8 is pressurized by a hydraulic pump, which is supplied to/discharged from the hoist cylinder 7, a steering cylinder for power steering, and the like.

Indicated at 9 are left and right front wheels (only the left one is shown in FIG. 1) which are rotatably provided in the lower side at the front portion of the vehicle body 2, and the front wheels 9 are arranged to be spaced in the vehicle width direction from each other. The front wheels 9 serve as steering wheels which are steered (steering operation) by a driver of the dump truck 1. The front wheel 9 is formed with a tire diameter (outside diameter dimension) of, for example, as much as 2 to 4 meters in the same way as rear wheels 10 to be described later.

Figure 2:
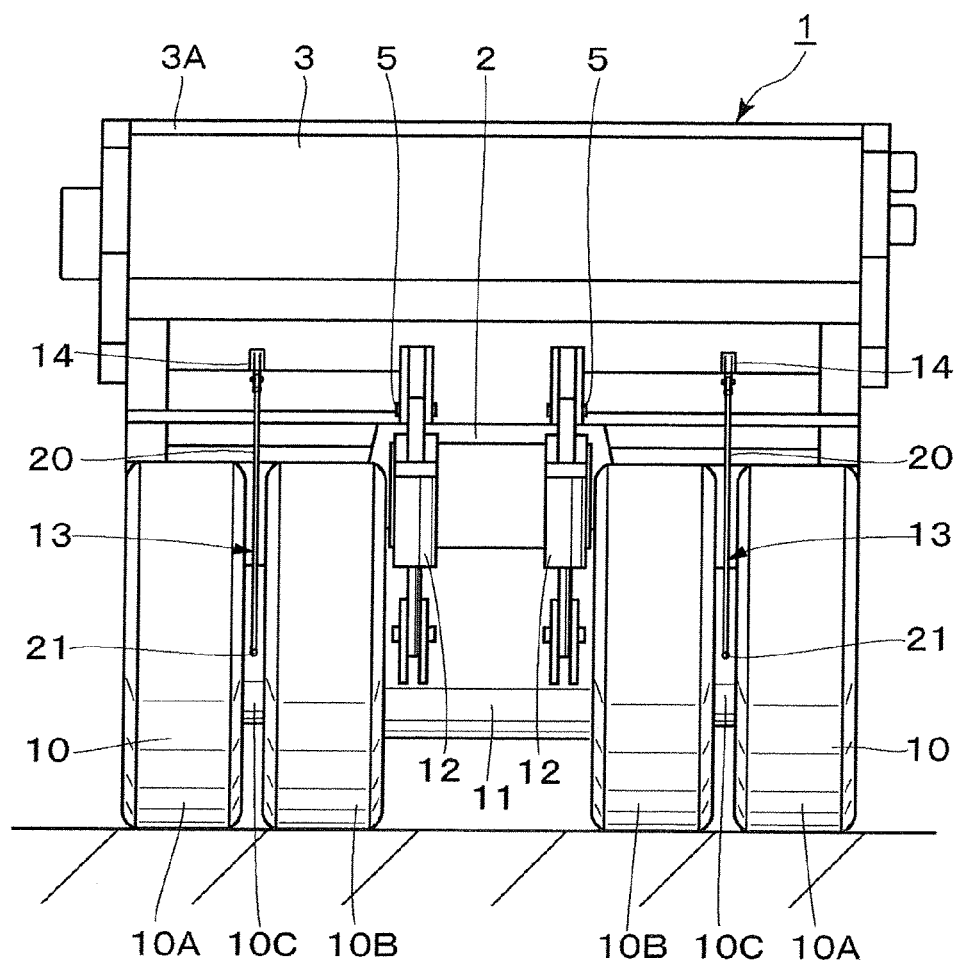
FIG. 2 is a right side view of FIG. 1 in which the dump truck is viewed from backward.
Figure 3:
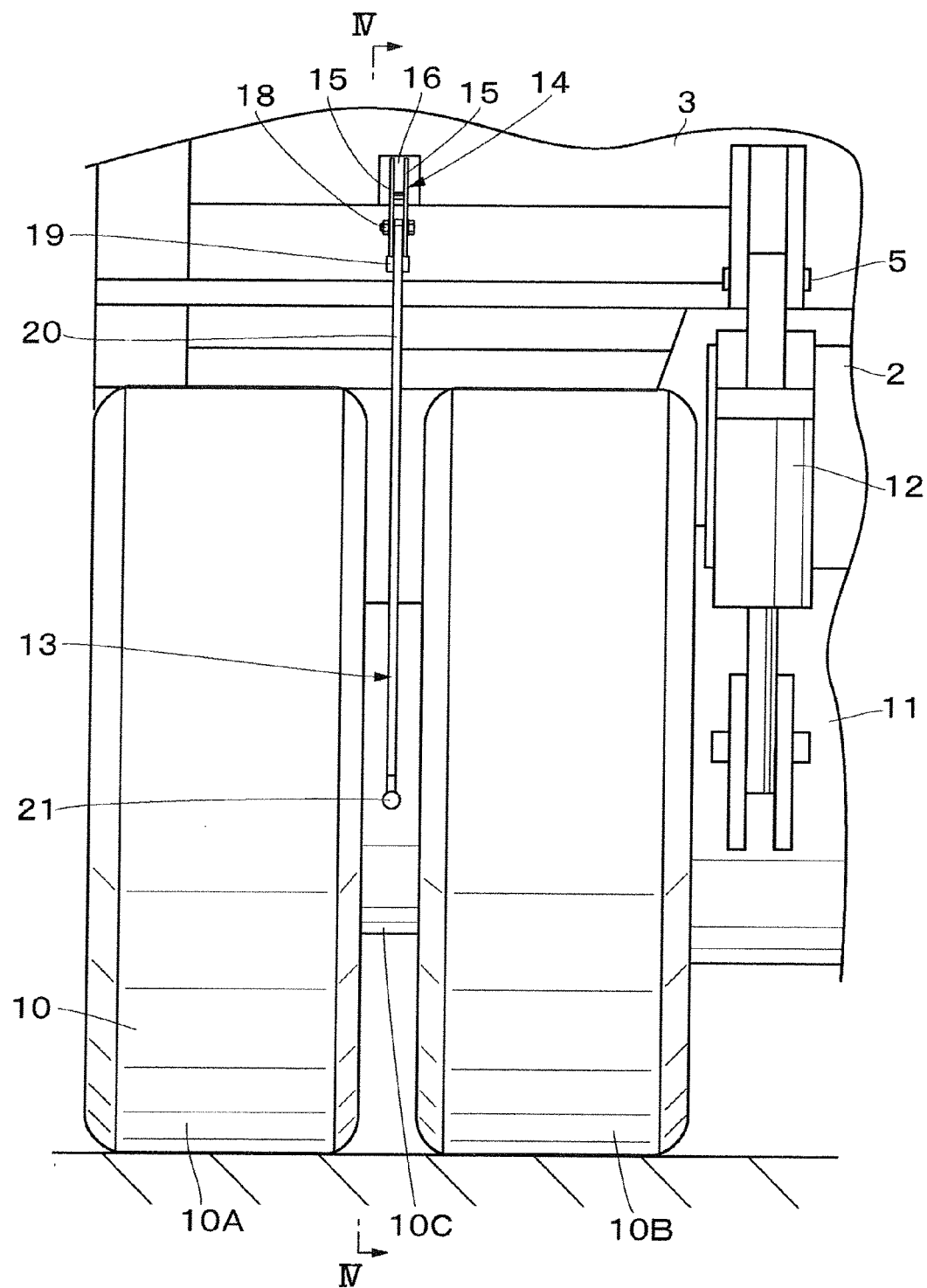
FIG. 3 is an enlarged view showing in an enlarged form left rear wheels, a foreign object removing device, and the like in FIG. 2.
Figure 4:
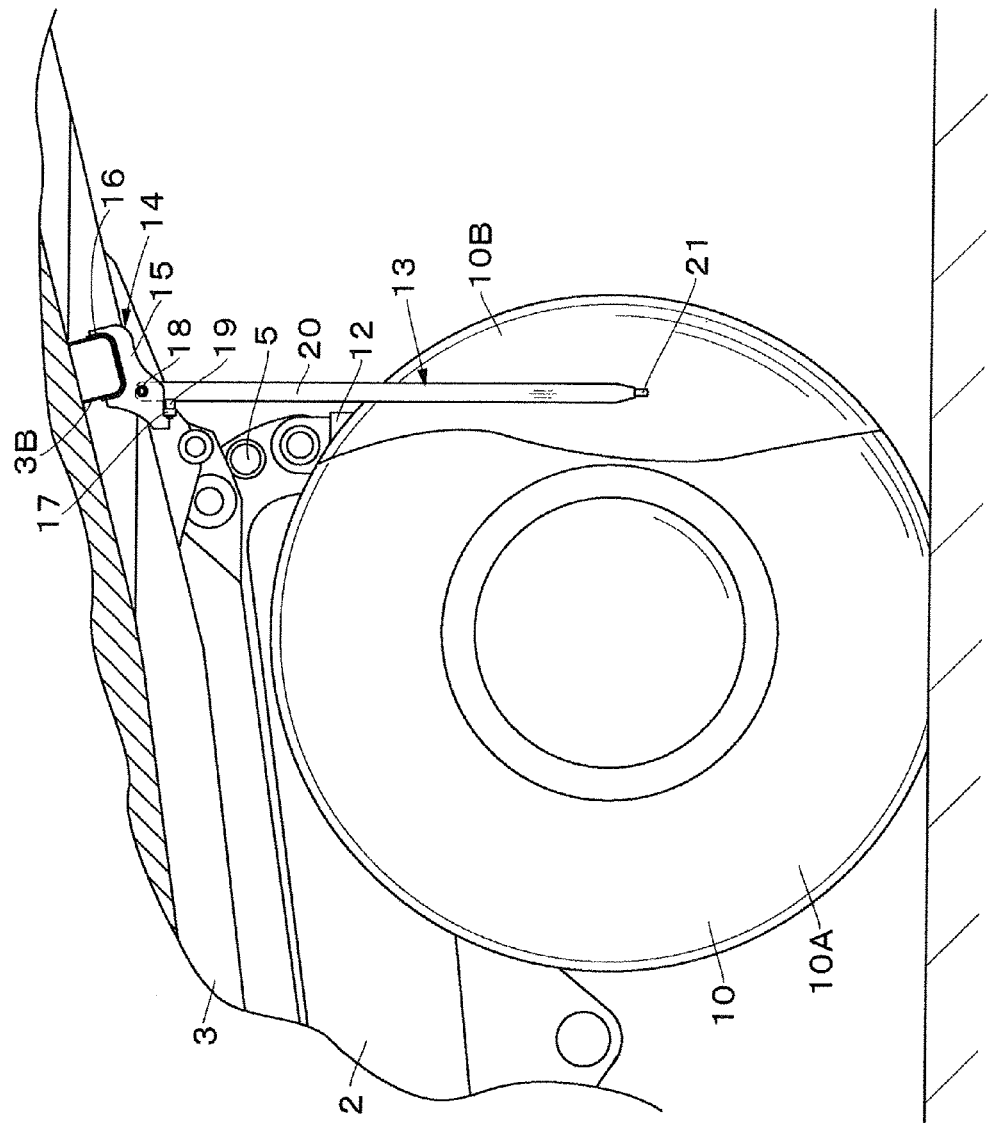
FIG. 4 is an enlarged cross-sectional view of essential portions as viewed from the direction of arrows IV-IV in FIG. 3.
Figure 5:
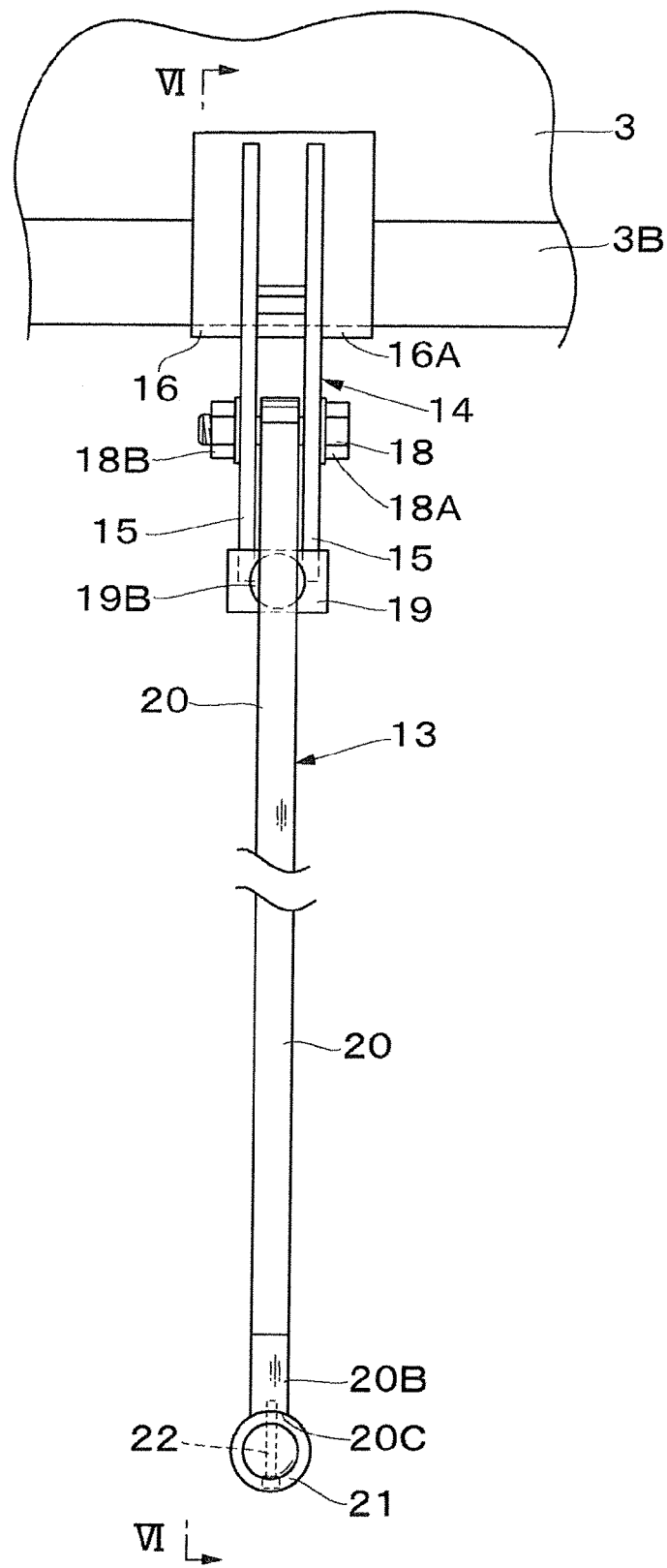
FIG. 5 is an enlarged view of essential portions showing in an enlarged form a foreign object removing device and the like in FIG. 3.

Indicated at 10 are left and right rear wheels which are rotatably provided in the lower side at the rear portion of the vehicle body 2, and the rear wheels 10 serve as drive wheels of the dump truck 1. Here, as shown in FIG. 2, each of the rear wheels 10 is constituted by a plural-tire type (for example, two tires) and the rear wheels 10 are arranged under the vehicle body 2 and the loading platform 3 to be spaced from each other in the vehicle width direction (right-left direction).

That is, any of the left and right rear wheels 10 includes an outer tire 10A positioned at the outer side in the vehicle width direction, an inner tire 10B positioned at the inner side in the vehicle width direction from the outer tire 10A, and a rim spacer 10C positioned between the outer tire 10A and the inner tire 10B to establish a clearance in the vehicle width direction therebetween.

A tubular axle housing 11 is provided between the left and right rear wheels 10 to extend in an axial direction (width direction of the vehicle body 2), and the rear wheels 10 each are rotatably provided in both end portions of the axle housing 11. Left and right traveling drive devices (any of them is not shown) incorporating, for example, a rotation source such as an electric motor, a reduction gear, and the like therein are provided in the axle housing 11, and by each operation of the traveling drive devices, the left and right rear wheels 10 each are driven and rotated independently from each other.

Left and right suspension cylinders 12 are provided between the rear portion of the vehicle body 2 and the respective rear wheels 10, and the suspension cylinder 12 is constituted by a hydraulic cylinder, for example. The suspension cylinder 12 suspends the rear portion side of the vehicle body 2 on the axle housing 11 (the left and right rear wheels 10) and absorbs vibrations in the upper-lower direction.

Next, the foreign object removing device 13 as a key portion in the first embodiment will be explained.

That is, designated at 13 are the foreign object removing devices provided under the rear portion of the loading platform 3, and the foreign object removing device 13 removes foreign objects such as earth and sand, and stones which get in (tuck down) between the rear wheels 10 of the plural-tire type (between the outer tire 10A and the inner tire 10B) from a road surface. The foreign object removing device 13 is largely constituted by a bracket 14, a bar-shaped member 20, and a shoe 21, which will be described later.

Denoted at 14 is the bracket for attaching the bar-shaped member 20 to be described later, and the bracket 14 is provided to be positioned under the rear portion of the loading platform 3 and in the upper side between the rear wheels 10 of the plural-tire type (between the outer tire 10A and the inner tire 10B). The bracket 14 supports an upper end side of the bar-shaped member 20 to be described later in such a manner as to be capable of rocking to the loading platform 3 in the front-rear direction (going direction) of the vehicle body 2. Therefore, the bracket 14 comprises a pair of vertical plates 15, a mounting plate 16, a connecting block 17, a rocking shaft 18, a stopper 19, and the like.

The pair of vertical plates 15 are arranged to be spaced from each other in the width direction (right-left direction) of the vehicle body 2 and extend in the upper-lower direction. Each vertical plate 15 is provided with a recessed notched portion 15A, into which the mounting plate 16 to be described later is fitted, in the upper side of the vertical plate 15 in a mounting state shown in FIG. 6.

Figure 6:
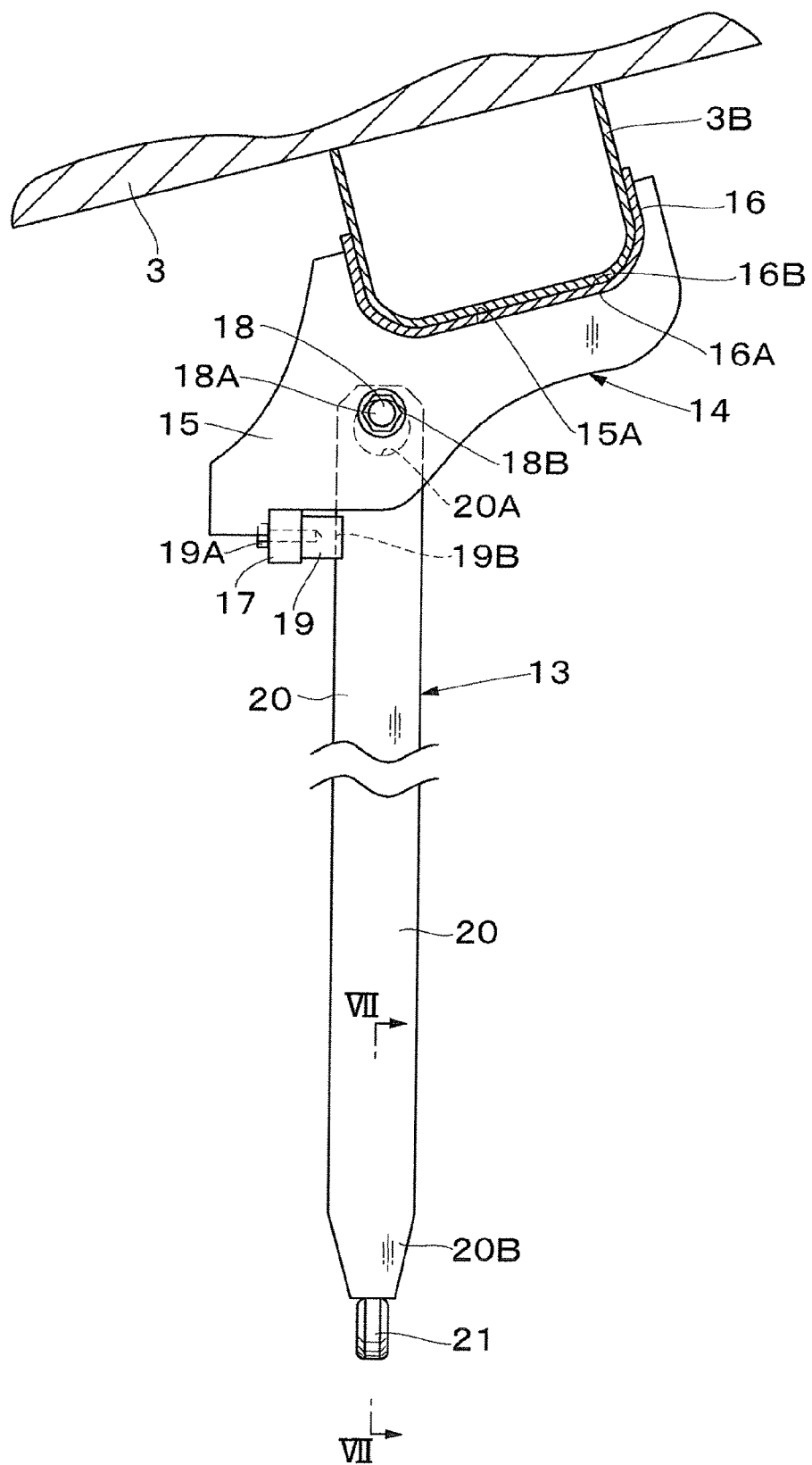
FIG. 6 is a cross-sectional view of the foreign object removing device and the like as viewed from the direction of arrows VI-VI in FIG. 5.

The mounting plate 16 is mounted in the upper side of each vertical plate 15 and is formed having a vertical section configuration of a substantially U-shape by molding a plate to be bent, for example. The mounting plate 16 fits a lower side convex surface 16A, which is convex to the lower side in a mounting state shown in FIG. 6, into the recessed notched portion 15A of each vertical plate 15 to be fixed by a welding device or the like. As shown in FIG. 6, the mounting plate 16 fits an upper side concave surface 16B, which is concave to the lower side, into a hollow frame member 3B provided on the bottom surface of the loading platform 3 to be fixed by a welding device or the like. In consequence, the mounting plate 16 is mounted in the lower side of the loading platform 3 integrally with each vertical plate 15.

The connecting block 17 is provided in a front portion of each vertical plate 15 in the front-rear direction of the vehicle body 2 at the lower portion of each vertical plate 15 and is bridged between the respective vertical plates 15 to be fixed by a welding device or the like. A stopper 19 to be described later is mounted to the connecting block 17.

The rocking shaft 18 is provided in a substantially central portion of each vertical plate 15, and is constituted by a set of a bolt 18A and a nut 18B mounted in a state of being bridged between the respective vertical plates 15. The bar-shaped member 20 to be described later is mounted to the bracket 14 to be capable of rocking thereto by using the rocking shaft 18.

The stopper 19 uses a bolt 19A to a surface opposing the bar-shaped member 20 to be mounted to the connecting block 17. The stopper 19 is formed of a resilient member such as an elastomer of rubber, metal, ceramics, or the like. Here, the stopper 19 has a recessed portion 19B making contact with a side surface of the bar-shaped member 20 to prevent the bar-shaped member 20 from rocking to the front side (side closer to the rim spacer 10C) of the vehicle body 2, and thus has a function of preventing the bar-shaped member 20 from colliding with the rim spacer 10C.

Designated at 20 is the bar-shaped member as the suspended member constituting the foreign object removing device 13, and the bar-shaped member 20 is formed extending in the upper-lower direction and is formed as one bar (for example, a metallic bar) having a substantially rectangular cross-sectional configuration. The bar-shaped member 20 has an upper end side mounted to the bracket 14 to be capable of rocking thereto.

Therefore, a through hole 20A having an inner diameter larger than an outer diameter of the rocking shaft 18 (bolt 18A) is formed in the upper end portion of the bar-shaped member 20. The rocking shaft 18 (bolt 18A) is inserted (loosely fitted) into the through hole 20A so that the bar-shaped member 20 is mounted through the rocking shaft 18 to the bracket 14 to be capable of rocking thereto in the front-rear direction.

Figure 7:
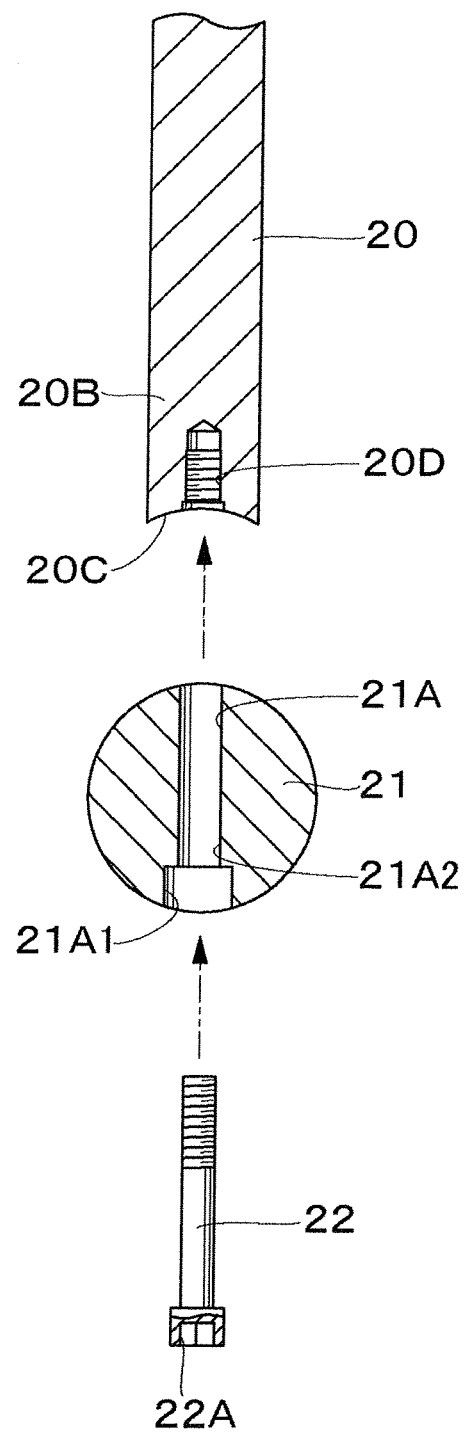
FIG. 7 is an exploded cross-sectional view of a suspended member and a shoe as viewed from the direction of arrows VII-VII in FIG. 6.

On the other hand, the bar-shaped member 20 has a lower end side which is inserted in a suspended state between the rear wheels 10 of the plural-tire type, that is, between the outer tire 10A and the inner tire 10B constituting the rear wheel 10. The bar-shaped member 20 has the lower end side provided with a tapered portion 20B formed therein and having a smaller cross-sectional area toward the tip end side (lower end side). As shown in FIG. 7, a recessed portion 20C having a concave and convex fit with the shoe 21 to be described later is provided in the tip end side (lower end side) of the tapered portion 20B. The recessed portion 20C has a bottom portion provided with a screw hole 20D formed therein, into which the bolt 22 to be described later is threaded.

Denoted at 21 is the shoe replaceably provided in the lower end of the bar-shaped member 20, and foreign objects such as earth and sand, and stones which get in (tuck down) between the outer tire 10A and the inner tire 10B from the road surface at the going travel of the dump truck 1 collide with the shoe 21 from downside. Therefore, the shoe 21 can flick out the foreign objects from between the outer tire 10A and the inner tire 10B.

As shown in FIG. 7, the shoe 21 is formed in a disc shape and is provided with a mounting bore 21A formed at the central portion and penetrating therethrough in the upper-lower direction. The mounting bore 21A is formed as a stepped bore having a large diameter portion 21A1 and a small diameter portion 21A2. Therefore, the shoe 21 is removably mounted to the lower end side of the bar-shaped member 20 by using a bolt 22, which will be described later, inserted into the mounting bore 21A.

The bolt 22 as a connecting tool to removably mount the shoe 21 to the bar-shaped member 20, and is formed as a bolt with a hexagonal hole (cap bolt) to be provided with a hexagonal hole 22A in the head portion. The bolt 22 is inserted into the mounting bore 21A of the shoe 21 and is threaded into the screw hole 20D of the bar-shaped member 20, thus fixing the shoe 21 to the lower end of the bar-shaped member 20.

Therefore, the shoe 21 can be mounted to the lower end side of the bar-shaped member 20 with a sufficient support strength. On the other hand, at the time of replacing the shoe 21, the bolt 22 is loosened and is then pulled out of the screw hole 20D and the mounting bore 21A, making it possible to easily remove the shoe 21 from the lower end side of the bar-shaped member 20.

The dump truck 1 according to the first embodiment has the aforementioned construction, and next, an operation thereof will be explained.

In a crushed stone site of a mine or the like, crushed stones 4 as a transport target are loaded on the loading platform 3 by using a large-sized hydraulic excavator (not shown). At this time, the loading platform 3 is arranged in a transport position shown in FIG. 1. Next, the dump truck 1 transports crushed stones 4 toward a predetermined unloading site in a state in which a large volume of crushed stones 4 are loaded on the loading platform 3.

On the other hand, in the unloading site, a driver in the cab 6 manually operates an operating lever (not shown) to expand the hoist cylinder 7 for inclining the loading platform 3 obliquely backward. In consequence, the crushed stones 4 in the loading platform 3 are discharged from the loading platform 3 in such a manner as to slide downward.

When the discharge of the crushed stones 4 is completed, a driver manually operates the operating lever to contract the hoist cylinder 7. In consequence, the loading platform 3 is rotated to the transport position shown in FIG. 1 and is seated on the vehicle body 2. In this state, the dump truck 1 prepares for the next transport operation.

Here, when the dump truck 1 travels in a working site, there are some cases where foreign objects such as earth and sand, and stones get in (tuck down) between the outer tire 10A and the inner tire 10B constituting the rear wheel 10 of the plural-tire type with rotation of the rear wheel 10 of the plural-tire type. In this case, the foreign objects collide with the shoe 21 provided in the lower end of the bar-shaped member 20 constituting the foreign object removing device 13 to be flicked out from the rear wheel 10 to an outside.

When the dump truck 1 travels on an uneven road surface, the axle housing 11 is inclined to the vehicle body 2 and the loading platform 3 accompanying a telescopic movement of the suspension cylinder 12. In consequence, a rotational center axis of the rear wheel 10 is in nonparallel with the bottom surface of the loading platform 3. Therefore, the lower end of the bar-shaped member 20 in the foreign object removing device 13 inserted in a suspended state from the loading platform 3 between the outer tire 10A and the inner tire 10B displaces relatively in a direction closer to the side surface of the outer tire 10A or the side surface of the inner tire 10B.

At this time, since earth and sand and the like are attached to the side surface of the outer tire 10A or the side surface of the inner tire 10B, when the shoe 21 provided in the lower end of the bar-shaped member 20 makes contact with the outer tire 10A or the inner tire 10B, the shoe 21 gradually wears down sharply. Consequently, there is a possibility that the shoe 21 which has worn down causes damage to the rear wheel 10.

For preventing this problem, the shoe 21 is replaced by a new shoe 21 before the shoe 21 wears down sharply (in a stage of a small degree of the wearing-down). That is, the bolt 22 is removed from the lower side of the bar-shaped member 20 to remove the shoe 21 from the bar-shaped member 20, thus replacing it for the new shoe 21. Therefore, it prevents the outer tire 10A and the inner tire 10B from being damaged by the shoe 21 which has worn down sharply.

According to the first embodiment, since the shoe 21 is provided in the lower end side of the bar-shaped member 20, the portion wearing down accompanying the vehicle traveling can be limited to the shoe 21. In this case, since the shoe 21 is replaceably mounted to the bar-shaped member 20, even if the shoe 21 wears down accompanying the vehicle traveling, only the shoe 21 which has worn down may be replaced, and as compared to replacement of the entire foreign object removing member as in the case of the conventional art, the replacement operation can be more easily performed.

As the replacement operation can be more easily performed in this manner, the shoe 21 can be more actively (more frequently) replaced before the shoe 21 sharply wears down (in a stage of a small degree of the wearing-down). Therefore, the rear wheel 10 can be hard to be damaged. As a result, durability and lifetime of the outer tire 10A and the inner tire 10B can be ensured to improve reliability of the dump truck 1.

According to the first embodiment, the upper end side of the bar-shaped member 20 in the foreign object removing device 13 is mounted through the rocking shaft 18 (bolt 18A) to the vertical plate 15 of the bracket 14 to be capable of rocking thereto. Accordingly, when the loading platform 3 is inclined obliquely backward to slide down crushed stones 4 from the loading platform 3, the bar-shaped member 20 can be maintained to be positioned between the rear wheels 10 (between the outer tire 10A and the inner tire 10B).

Further, according to the first embodiment, since the shoe 21 is removably mounted to the bar-shaped member 20 by the bolt 22. Therefore, securement of a mounting strength and a support strength of the shoe 21 to the bar-shaped member 20, and the easiness of the removal (replacement) of the shoe 21 from the bar-shaped member 20 are compatible in a high dimension.

Figure 8:
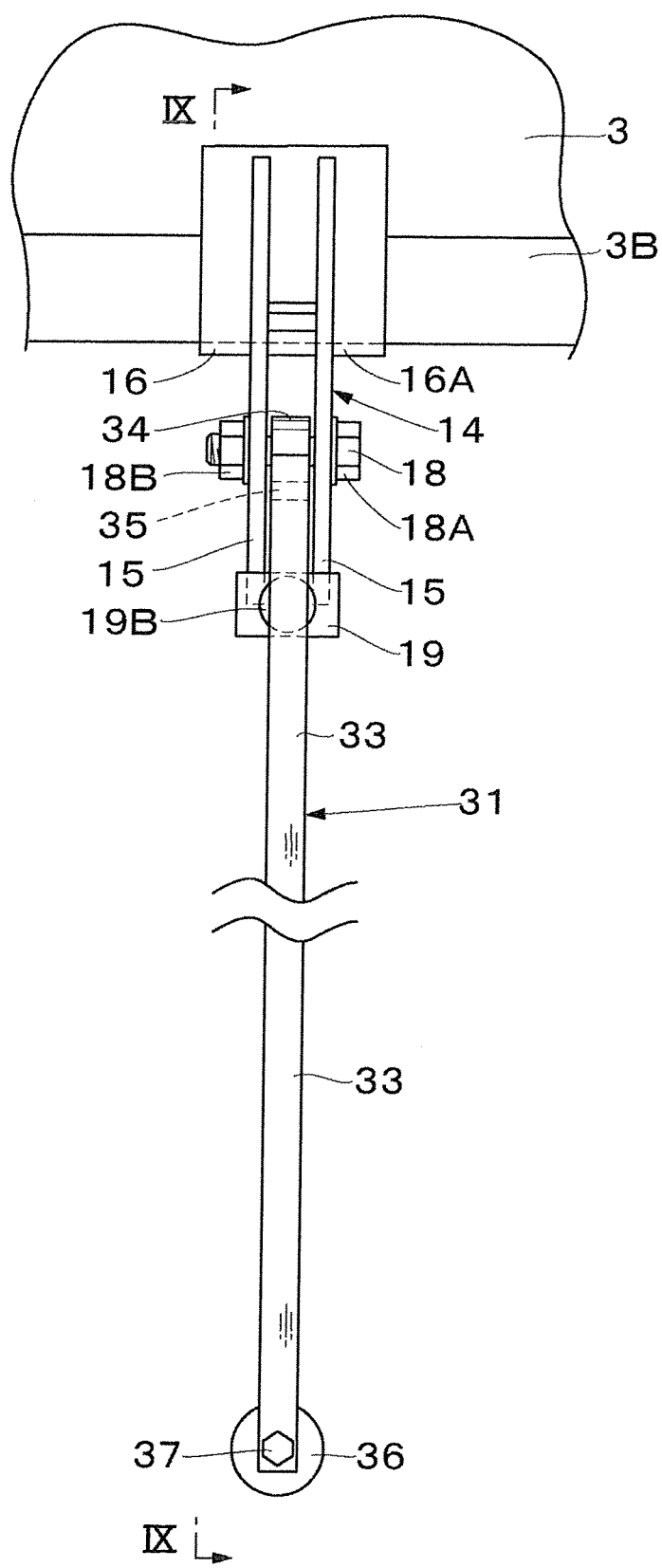
FIG. 8 is an enlarged view of essential portions showing a foreign object removing device and the like according to a second embodiment of the present invention, as viewed from a position similar to FIG. 5.
Figure 9:
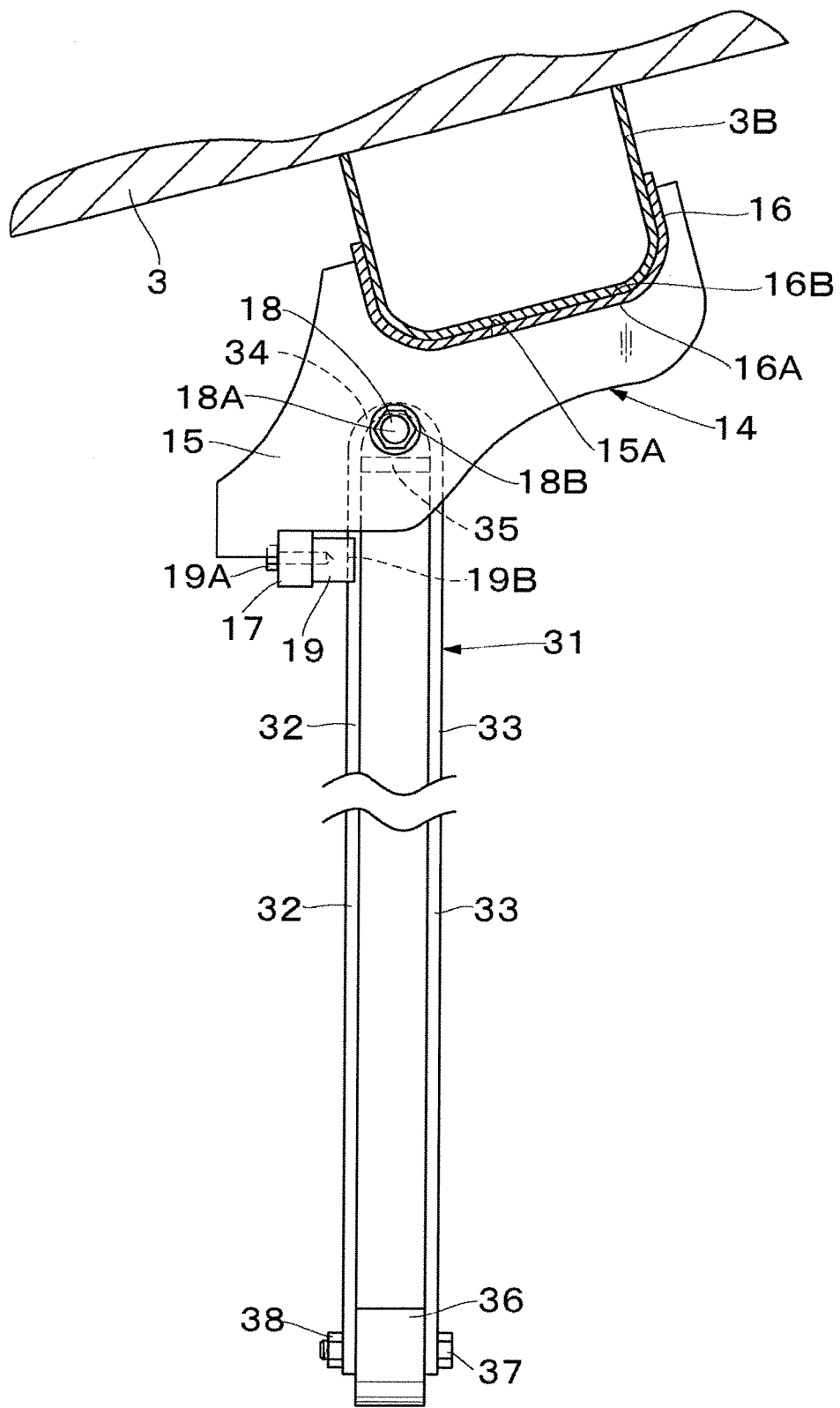
FIG. 9 is a cross-sectional view of the foreign object removing device and the like as viewed from the direction of arrows IX-IX in FIG. 8.
Figure 10:
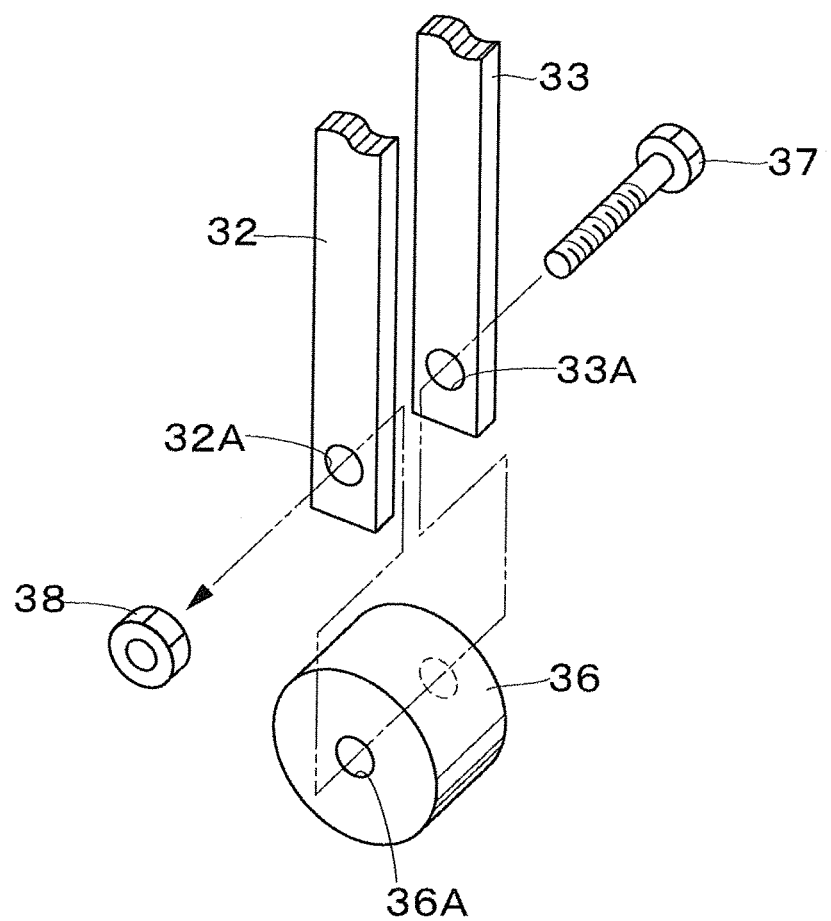
FIG. 10 is an exploded perspective view showing the suspended member and the shoe.

Next, FIG. 8 to FIG. 10 show a second embodiment of the present invention. The characteristic feature of the present embodiment is that a suspended member in a foreign object removing device comprises a pair of plate-shaped members, wherein a shoe is mounted between the respective plate-shaped members. It should be noted that in the present embodiment, the component elements that are identical to those in the foregoing first embodiment will be simply denoted by the same reference numerals to avoid repetitions of similar explanations.

In the figure, designated at 31 is a foreign object removing device according to the second embodiment, which comprises a bracket 14, plate-shaped members 32 and 33, and a shoe 36, which will be described later, as similar to the foreign object removing device 13 according to the first embodiment.

Denoted at 32 and 33 are a pair of plate-shaped members as suspended members constituting the foreign object removing device 31. Here, in regard to formation of the respective plate-shaped members 32 and 33, one plate-shaped material is folded back at the intermediate portion by 180° to form the front and rear plate-shaped members 32 and 33 which are spaced from each other in the front-rear direction to the going direction of the vehicle body 2 and extend in the upper-lower direction.

As shown in FIG. 9, the front and rear plate-shaped members 32 and 33 have upper end sides each connected by a folding-back portion 34. On the other hand, as shown in FIG. 10, the respective plate-shaped members 32 and 33 have lower end sides provided with bolt through bores 32A and 33A which are formed therein and through which a bolt 37 to be described later is inserted.

A connecting member 35 is provided in the upper end side of the respective plate-shaped members 32 and 33 under the folding-back portion 34, and is fixed by a welding device or the like in a state of being bridged between the plate-shaped members 32 and 33. The rocking shaft 18 (bolt 18A) is inserted into a portion which is the upper side of the connecting member 35 and surrounded by the folding-back portion 34 and the plate-shaped members 32 and 33. The respective plate-shaped members 32 and 33 are mounted though the rocking shaft 18 (bolt 18A) to the bracket 14 to be capable of rocking thereto in the front-rear direction.

Denoted at 36 is the shoe replaceably provided in a lower end of each of the front and rear plate-shaped members 32 and 33, and foreign objects such as earth and sand, and stones which get in (tuck down) the rear wheel 10 at the going travel of the dump truck 1 collide with the shoe 36. Therefore, the shoe 36 can flick out the foreign objects from between the outer tire 10A and the inner tire 10B.

Here, as shown in FIG. 10, the shoe 36 is formed in a columnar shape and is provided with a mounting bore 36A formed at the central portion to penetrate in the front-rear direction. The shoe 36 is removably attached between the respective plate-shaped members 32 and 33 by a bolt 37, which will be described later, inserted into the mounting bore 36A.

The bolt 37 as a connecting tool serves to removably mount the shoe 36 to the plate-shaped members 32 and 33, and the bolt 37 is provided to be inserted into bolt through bores 32A and 33A of the respective plate-shaped members 32 and 33 and the mounting bore 36A of the shoe 36 to extend in the front-rear direction. The bolt 37 is threaded at the tip end side into a nut 38, thus fixing the shoe 36 between the plate-shaped members 32 and 33.

Therefore, the shoe 36 can be mounted between the plate-shaped members 32 and 33 with a sufficient support strength. At the time of replacing the shoe 36, the nut 38 is loosened and the bolt 37 is then pulled out of the bolt through bores 32A, and 33A, and the mounting bore 36A, making it possible to easily remove the shoe 36 from between the plate-shaped members 32 and 33.

According to the second embodiment, since the shoe 36 is replaceably mounted to the lower end side of each of the respective plate-shaped members 32 and 33 by using the bolt 37 and the nut 38, the shoe 36 can be easily replaced before the shoe 36 wears down sharply (in a stage of a shallow degree of the wearing-down). Accordingly, in the second embodiment also, the operational effect similar to that of the above-mentioned first embodiment can be obtained.

Particularly according to the second embodiment, since the shoe 36 is mounted between the front and rear plate-shaped members 32 and 33, the shoe 36 can be stably supported in a state of being tightly held from both the sides in the front-rear direction.

Further, since the respective plate-shaped members 32 and 33 are formed integrally by folding back the intermediate portion of one plate-shaped material by 180°, the plate-shaped members 32 and 33 can be easily manufactured by bending work, reducing costs of the foreign object removing device 31.

It should be noted that the second embodiment is explained by taking a case of inserting the bolt 37 into the mounting bore 36A provided in the shoe 36 as an example. However, the present invention is not limited thereto, and, for example, the bolt 37 may be inserted though a sleeve (not shown) inside the mounting bore 36A to rotatably support the shoe 36 between the front and rear plate-shaped members 32 and 33. In a case of thus supporting the shoe 36 rotatably, when the shoe 36 collides with foreign objects such as earth and sand or makes contact with the side surfaces of the outer tire 10A and the inner tire 10B, the shoe 36 can be smoothly rotated, which makes the shoe 36 hard to wear down.

Each of the aforementioned embodiments is explained by taking a case of using the disc-shaped or the columnar-shaped shoe 21 or 36 as an example. However, the present invention is not limited thereto, and, for example, a shoe in another shape such as a rectangular shoe may be used.

On the other hand, the aforementioned first embodiment is explained by taking a case where the shoe 21 is removably mounted to the bar-shaped member 20 by using the bolt 22 as an example, and the aforementioned second embodiment is explained by taking a case where the shoe 36 is removably mounted to the respective plate-shaped members 32 and 33 by using the bolt 37 as an example. However, the present invention is not limited thereto, and instead of the bolt, the shoe may be removably mounted to the suspended member by using a different connecting tool such as a connecting pin or the like.

In addition, each of the aforementioned embodiments is explained by taking a case where the bracket 14 in the foreign object removing device 13 or 31 is provided in the bottom surface of the loading platform 3 as an example. However, the present invention is not limited thereto, and the bracket may be mounted to the vehicle body side.

Further, each of the aforementioned embodiments is explained by taking a case where the vehicle wheel of the plural-tire type is constructed by the two tires (outer tire 10A and inner tire 10B) as an example. However, the present invention is not limited thereto, and, for example, the vehicle wheel of the plural-tire type may be constructed by three or four tires. In this case, the foreign object removing device may be provided between the respective tires.

DESCRIPTION OF REFERENCE NUMERALS

1: Dump truck (Transporter vehicle)
2: Vehicle body
3: Loading platform
9: Front wheel
10: Rear wheel
13, 31: Foreign object removing device
14: Bracket
20: Bar-shaped member (Suspended member)
21, 36: Shoe
22, 37: Bolt (Connecting tool)
32: Front plate-shaped member (Suspended member)
33: Rear plate-shaped member (Suspended member)

What is claimed is:
1. A transporter vehicle comprising:
an automotive vehicle body;
a loading platform which is provided tiltably on said vehicle body;
front wheels arranged at a front side of said vehicle body to be spaced from each other in the vehicle width direction;
rear wheels of a plural-tire type arranged at a rear side of said vehicle body to be spaced from each other in the vehicle width direction; and
a foreign object removing device for removing foreign objects getting in between said rear wheels of the plural-tire type,
wherein said foreign object removing device comprises:
a bracket provided in a lower side of said loading platform or in said vehicle body; and a suspended member, an upper end side of which is attached to said bracket in such a manner as to be capable of rocking thereto and a lower end side of which is provided in a suspended state between said rear wheels of the plural-tire type,
wherein, a shoe is provided in a lower end side of said suspended member and protrudes further downward than said suspended member,
said shoe is formed in one of a disc shape, a columnar shape and a rectangular shape, said shoe collides with said foreign object, which is between said rear wheels, to remove said foreign object, and said shoe is detachably connected to said lower end side of said suspended member so as to be replaceable when said shoe wears down, said suspended members are provided to be spaced from each other in the front-rear direction of said vehicle body, and are formed by a pair of plate-shaped members extending in the upper-lower direction, said shoe is provided with a connecting tool inserted thereinto to extend in the front-rear direction and is removably attached between said pair of plate-shaped members by said connecting tool, and said shoe is rotatably supported between said pair of plate-shaped members.

2. A transporter vehicle according to claim 1, wherein said bracket is attached in a lower side of a rear portion of said loading platform to be positioned between said rear wheels of the plural-tire type, and said suspended member has an upper end side attached through a rocking shaft to said bracket to be capable of rocking thereto.

* * * * *